United States Patent
Choi

(10) Patent No.: US 7,062,271 B2
(45) Date of Patent: Jun. 13, 2006

(54) CELL SELECTION METHOD OF MOBILE TERMINAL

(75) Inventor: Yoon Seok Choi, Anyang-shi (KR)

(73) Assignee: LG Electronics, Inc., Seoul (KR)

( * ) Notice: Subject to any disclaimer, the term of this patent is extended or adjusted under 35 U.S.C. 154(b) by 362 days.

(21) Appl. No.: 10/219,263

(22) Filed: Aug. 16, 2002

(65) Prior Publication Data

US 2003/0040311 A1    Feb. 27, 2003

(30) Foreign Application Priority Data

Aug. 16, 2001    (KR)    ................................ 2001-49302

(51) Int. Cl.
*H04Q 7/20*     (2006.01)
*H04B 1/18*     (2006.01)
(52) U.S. Cl. .................... 455/434; 455/165.1; 370/352
(58) Field of Classification Search ................ 455/434, 455/165.1; 370/352

See application file for complete search history.

(56) References Cited

U.S. PATENT DOCUMENTS 6,463,054 B1 * 10/2002 Mazur et al. ............... 370/352
6,850,744 B1 * 2/2005 Moore ...................... 455/165.1
2003/0040311 A1 * 2/2003 Choi .......................... 455/434

FOREIGN PATENT DOCUMENTS

| CN | 1160472 | 9/1997 |
|---|---|---|
| KR | 2001-0032466 | 4/2001 |
| KR | 2001-0048490 | 6/2001 |

OTHER PUBLICATIONS

Chinese Office Action dated Mar. 25, 2005.

* cited by examiner

*Primary Examiner*—William D. Cumming
(74) *Attorney, Agent, or Firm*—Fleshner & Kim LLP

(57) ABSTRACT

A system and method for managing communications in a mobile terminal selects a serving cell of a first PLMN for the mobile terminal, monitors signal strengths of neighboring cells in at least a second PLMN, classifies the neighboring cells as signal-receivable cells and signal non-receivable cells based on the monitored signal strengths, determines whether cell reselection is required, searches for state information corresponding only to the signal-receivable neighboring cells, and selecting one of the same receiving cell or one of the signal-receivable neighboring cells as a new serving cell. By searching only a pre-stored list of signal-receivable cells instead of all neighboring cells around the mobile terminal, the time for reselecting a cell during mobile terminal operation is significantly reduced.

20 Claims, 4 Drawing Sheets

FIG. 1
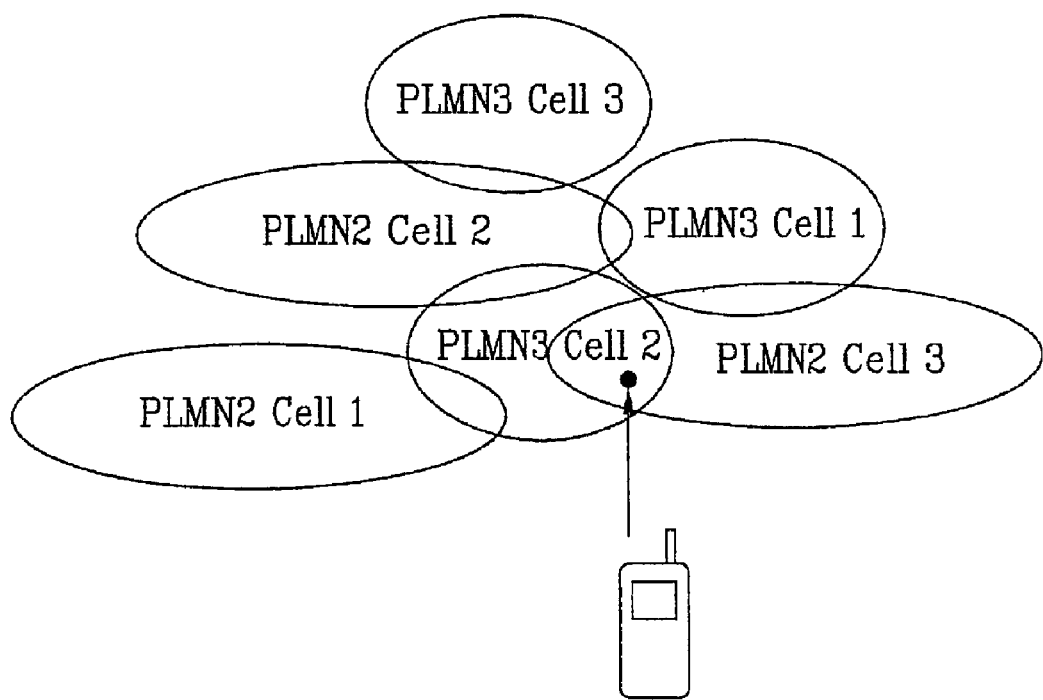
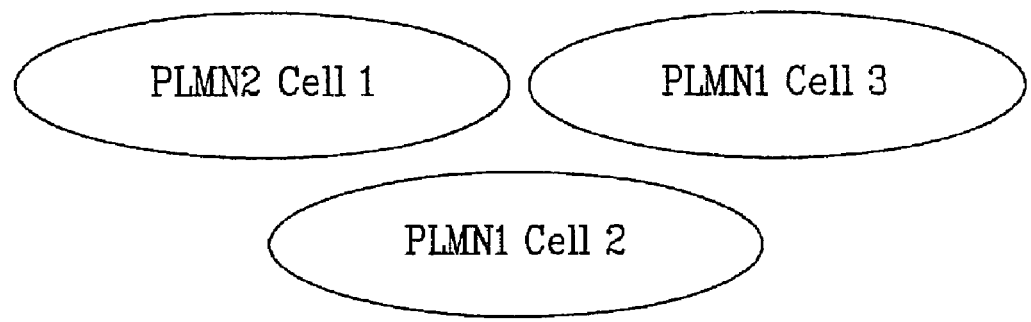

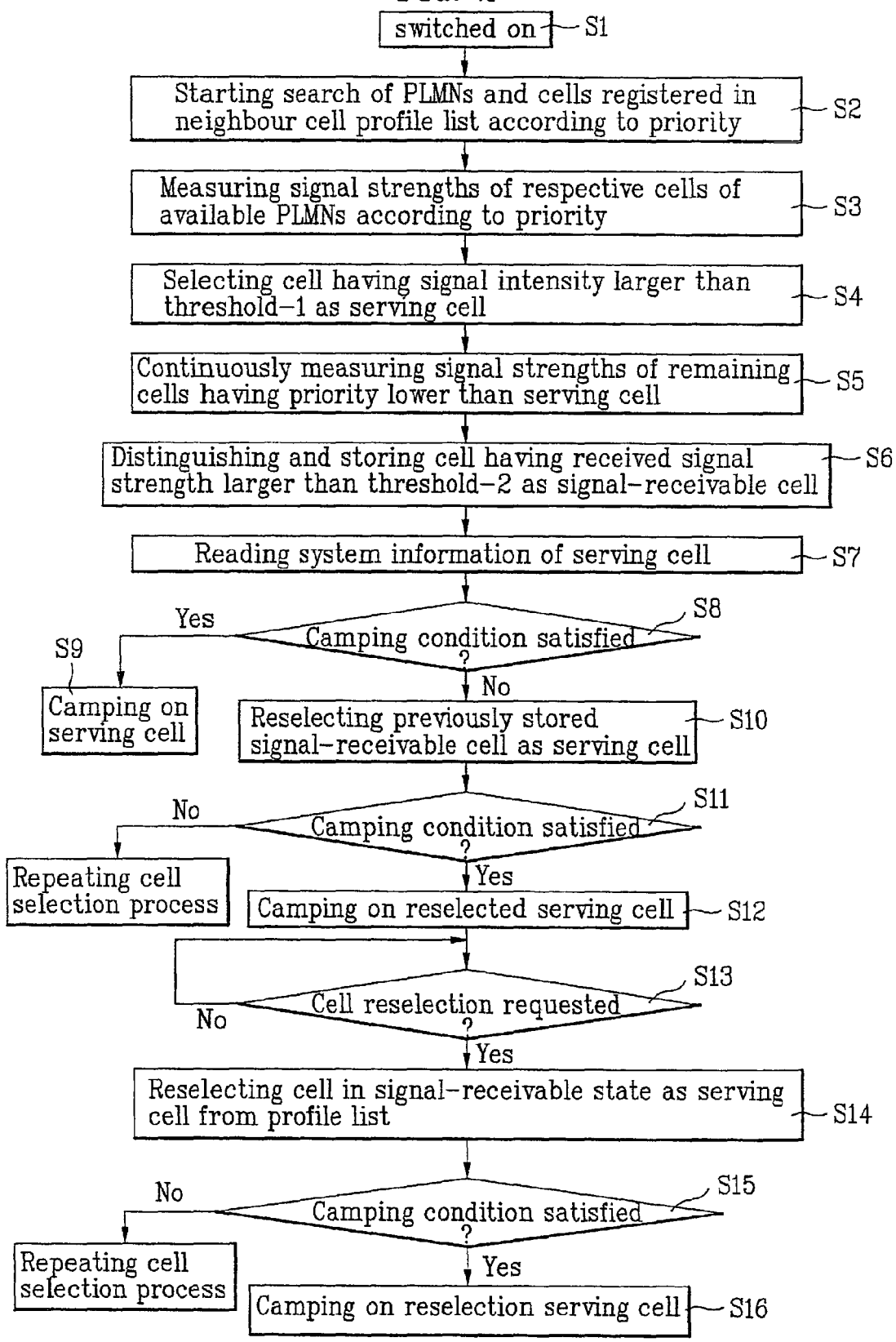

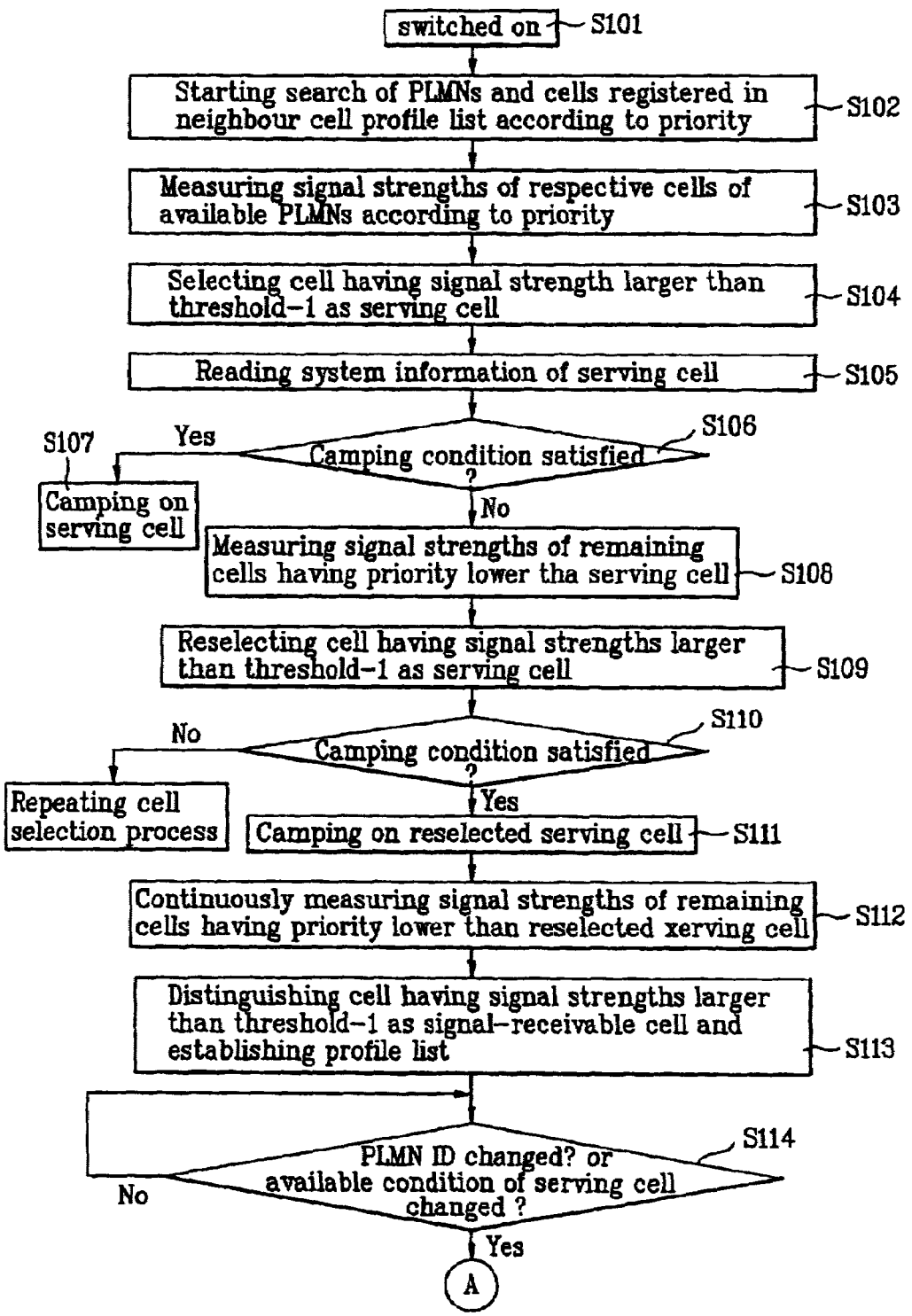

CELL SELECTION METHOD OF MOBILE TERMINAL

BACKGROUND OF THE INVENTION

1. Field of the Invention

The present invention relates to a next generation mobile terminal, and more particularly to a system and method for performing cell selection in a terminal of a mobile communications system.

2. Background of the Related Art

A public land mobile network (PLMN) is a network created for the purpose of providing land mobile communication services. Generally, PLMN is restricted by geographical borders, and at least one PLMN may exist in every country according to the international rules and regulations. If several PLMNs exist in one country, areas of these PLMNs often overlap, and areas of PLMNs may also overlap in the borders between different countries.

In order to provide service, a terminal that is moving must select a serviced PLMN whenever necessary. This usually occurs as follows. When a mobile terminal (MT) is switched on, it attempts to make contact with a PLMN. A particular PLMN is selected either automatically or manually. Once the PLMN is selected, the MT looks for a suitable cell within the chosen PLMN and chooses that cell to provide available services. This choosing is known as "camping on the cell." If the MT subsequently loses coverage of the chosen cell, it reselects a most suitable alternative cell of the selected PLMN and camps on that cell. And, if the MT loses coverage of a PLMN, either a new PLMN is selected automatically or an indication of which PLMNs are available is given to the user, so that a manual selection can be made.

Thus, the MT carries out PLMN selection and cell selection/reselection from the point it is switched on, and finally selects a current serving cell. The cell selection process maybe classified largely into normal cell selection and stored list cell selection.

The normal cell selection is a process of initial cell selection, and is carried out when the MT is switched on. More specifically, the normal cell selection is a process in which the MT searches all radio frequency (RF) carriers received without previous information, compares them with each other, and selects a cell having the maximum power as a current serving cell.

The stored list cell selection is a process in which the MT periodically and successively measures signal quality of cells, and updates a profile list of one or more neighbor cells based on provided cell information. Later, the stored list cell selection allows the MT to select a serving cell using cell information, e.g., scrambling codes known from signal quality of respective cells and a neighbor cell profile list previously measured and stored. In particular, in the stored list cell selection process, the stored list represents IDS of PLMNs that can permit roaming of the MT and IDS of cells in which camping of the MT has been performed. In other words, a scrambling code that is inherently assigned to each cell is used as an ID, and this ID is stored.

In the foregoing discussion, the serving cell indicates a cell providing the MT with communication service at a present time, and a neighbor cell indicates cells adjacent to the serving cell. The neighbor cells include at least one available cell that is serviceable and at least one non-available cell that is non-serviceable.

In systems using the conventional stored list cell selection, if a PLMN ID is changed by request of the MT user or as a result of a change in an available condition of the current serving cell, it is necessary to again perform the process of the initial cell selection.

The following table 1 represents stored list for the cell selection in the communication network shown in FIG. 1, in which PLMN ID-1, PLMN ID-2 and PLMN ID-3 that are information of roaming-capable PLMN, and Cell ID-1, Cell ID-2 and Cell ID-3 that are neighbor cell information pertaining to the respective PLMNs are stored.

TABLE 1

| | Stored List | |
|---|---|---|
| PLMN ID-1 | PLMN ID-2 | PLMN ID-3 |
| Cell ID-1 | Cell ID-1 | Cell ID-1 |
| Cell ID-2 | Cell ID-2 | Cell ID-2 |
| Cell ID-3 | Cell ID-3 | Cell ID-3 |

In a state where this list is stored, it is assumed that the MT is positioned at an overlapped area of Cell 2 of PLMN 3 and Cell 3 of PLMN 2 as shown in FIG. 1.

When selecting the serving cell, the MT utilizes the stored list. Then, when it is assumed that the stored list is assigned priority in the order of PLMN IDS shown in table 1, a cell search for the cell selection is sequentially carried out from Cell 1 of PLMN 1.

When it is assumed that the MT camps on Cell 3 of the PLMN 2 through the aforementioned cell selection process, if the available condition of the PLMN 2 is later changed or if the signal strength of the PLMN 2 does not reach a prescribed threshold and thus the signal quality is non-available, there may occur a case in which Cell of other available PLMN has to be searched or a case in which user of the MT wishes to reselect the PLMN 3. In such a case, the MT has to again start the search from the Cell 1 of the PLMN 1, of which priority is prescribed as shown in table 1.

The MT does not camp on the Cell 2 of the PLMN 3 until it again measures signal strengths for the Cells of the PLMN 1, the Cells of the PLMN 2 and the Cell 1 of the PLMN 3. In other words, it is necessary to again perform the process of the initial cell selection from the very beginning.

In a final step, the conventional stored list cell selection method utilizes IDS of PLMNs that can permit the roaming of the MT, and IDS of cells that the MT was previously camped on.

After the MT camps on a cell of a specific PLMN, if there occurs a case in which the available condition of PLMN on service is changed into non-available condition or user of the MT is willing to reselect not current PLMN on service but other PLMN, the process of initial cell selection most again be performed. The conventional stored list cell selection method therefore has a drawback in that it takes much time for the MT to reselect the cell.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a cell selection method of a mobile terminal suitable for facilitating reselection of a cell for the mobile terminal, in which the mobile terminal stores in a neighbor cell profile, IDS of roaming-capable PLMNs, IDS of cells on which the mobile terminal was previously camped, and identification information/state information on cells of respective PLMNs in which signal strength of degree receivable by the mobile terminal is measured.

These objects and other objects and advantages of the present invention are achieved by providing a cell selection method of a mobile terminal which includes: a first step of searching at the mobile terminal respective cells of roaming-capable PLMNs according to prescribed priorities; a second step of selecting at the mobile terminal a specific cell as a serving cell, the mobile terminal transmitting a signal in an intensity that is relatively greater than a preset threshold-1 to the specific cell; a third step of storing at the mobile terminal information including whether or not remaining cells other than the selected serving cell can receive signals; and a fourth step of reselecting at the mobile terminal one cell that can receive a signal based on the stored information.

Preferably, the third step measures received signal strengths of the remaining cells having priorities lower than the serving cell after the serving cell is selected, and distinguishes and stores the remaining cells into signal-receivable cell and signal-non-receivable cell on the basis of the threshold-1.

Finally, when reselecting the specific cell, the mobile terminal preferentially searches the cells of the PLMN set in the serviceable state.

Also, the third step measures signal strengths of the remaining cells having priorities lower than the serving cell after the severing cell is selected, compares the measured signal strengths with a threshold-2 that is set in a value that is relative smaller than the threshold-1, and distinguishes and stores the remaining cells into signal-receivable cell and signal-non-receivable cell on the basis of the threshold-2.

When reselecting the specific cell, the mobile terminal preferentially searches the signal-receivable cell, reads system information of the preferentially searched cell to determine whether or not the preferentially searched cell camps on, and if the searched cell meets a camping condition, camps on the cell.

Finally, the third step allows the mobile terminal to store, in a neighbor cell profile list, information including whether or not the remaining cells except for the selected serving cell can receive a signal, signal strength and the priority of the signal strength.

At this time, when reselecting the specific cell, the mobile terminal searches the cells according to the priorities of the signal strengths stored in the profile list.

It is to be understood that both the foregoing general description and the following detailed description of the present invention are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a schematic view showing a communication area of a roaming-capable mobile terminal so as to illustrate a cell selection;

FIG. 2 illustrates a cell selection procedure of a mobile terminal in accordance with a first embodiment of the present invention.

DETAILED DESCRIPTION OF PREFERRED EMBODIMENTS

Figure 3:
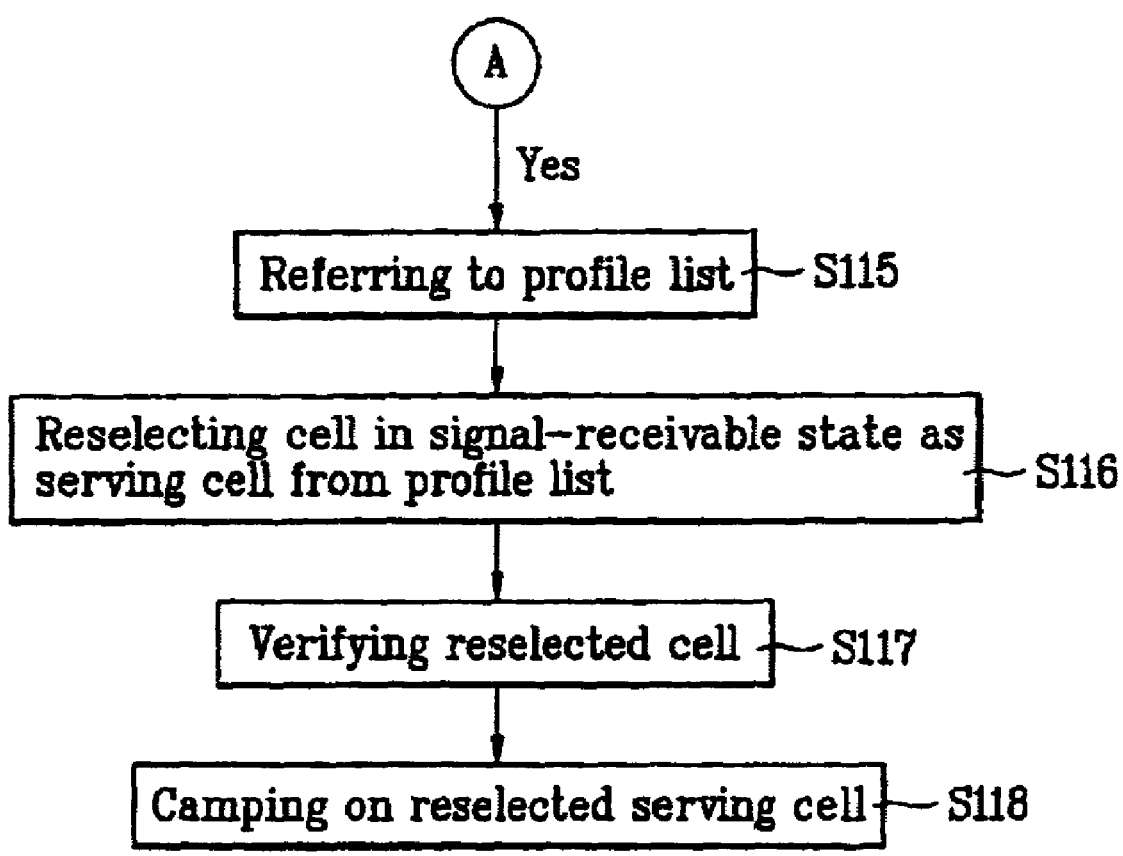
FIG. 3 illustrates a cell selection procedure of a mobile terminal in accordance with a second embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

Initially, it is to be understood that in order to facilitate description of the present invention, the PLMN that provides a mobile terminal with service is referred to as "home PLMN", and PLMN that can permit the roaming of the mobile terminal is referred to as "available PLMN". Also, various cells are classified into serving cells and neighbor cells depending on whether or not they can provide service, and are also classified into available cells and non-available cells depending on whether or not they are serviceable. In particular, an available cell is a cell having a received signal strength which is more than a prescribed threshold, and a non-available cell is a cell having a received signal strength which is less than the prescribed threshold.

In the present invention, a measured signal quality is compared with a prescribed threshold to determine an available condition. Threshold-1 is a standard for determining an available cell and non-available cell, and threshold-2 is a standard for determining whether a cell transmits at a useful signal strength or at a non-useful signal strength. Also, threshold-1 has a value larger than threshold-2. Values of respective thresholds may actively vary in wireless environments.

In the cell selection method of the present invention, the mobile terminal stores respective IDS for PLMNs that can permit roaming of the mobile terminal, and IDS of cells that are non-available but whose signal strength is measured, among respective cells of the PLMNs, by the mobile terminal. The mobile terminal further stores state information (whether or not to receive signal) of the stored PLMNs and Cells.

Since the mobile terminal stores PLMN ID and Cell ID along with their states according to measurement of signal strength, when PLMN ID is changed by a user of the mobile terminal, or an available condition of current serving cell is changed, steps are taken so that not all PLMNs and Cells registered in the neighbor cell profile list are searched.

More specifically, in accordance with at least one embodiment of the present invention, since available PLMNS capable of receiving signals are known in advance and since available cells within the available PLMNs and having receivable signal strengths are in known advance in the process of cell reselection not all PLMNs and cells registered in the neighbor cell profile list are searched according to prescribed priorities. In other words, it is possible to directly select an available cell among PLMNs and cells registered in the neighbor cell profile list. The present invention optionally provides a process which verifies serviceability based on the system information of the selected available cell.

Table 2 represents stored information which maybe used for cell selection in the communication network shown in FIG. 1. The stored information includes PLMN ID-1, PLMN ID-2 and PLMN ID-3 which provides roaming-capable PLMN information, and Cell ID-1, Cell ID-2 and Cell ID-3 which corresponds to neighbor cell information pertaining to the respective PLMNs. Also, the stored information includes serviceability of the respective PLMNs and available conditions of the Cell IDS pertaining to the respective PLMNs.

Table 2

When the mobile terminal initially selects a cell using the stored list shown in table 2, although the selected cell is a PLMN and Cell ID that is not selected when the signal strength is measured more than the threshold level, the mobile terminal stores the information as in the above table 2. As a result, Cell ID-3 of PLMN ID-2 and Cell ID-2 of PLMN ID-3 can know in advance that the mobile terminal is transmitting a signal at receivable signal strength.

TABLE 2

| Stored List | |
|---|---|
| PLMN ID-1 | Non-receivable |
| Cell ID-1 | NO |
| Cell ID-2 | NO |
| Cell ID-3 | NO |
| PLMN ID-2 | Receivable |
| Cell ID-1 | NO |
| Cell ID-2 | NO |
| Cell ID-3 | YES |
| PLMN ID-3 | Receivable |
| Cell ID-1 | NO |
| Cell ID-2 | YES |
| Cell ID-3 | NO |

Accordingly, when there occurs a case in which the mobile terminal that was camped on Cell 3 of PLMN 2 has to reselect cell, the mobile terminal first confirms PLMN IDS that were previously registered in the table 2, and preferentially searches a serviceable PLMN ID. As a result, the invention does not perform such a search from PLMN 1 but selects one cell of PLMN 2 to PLMN 3 as the serving cell.

In accordance with another illustrative aspect of the invention, when there occurs a case in which the mobile terminal has to reselect a cell, the mobile terminal first confirms PLMN IDS that were previously registered from the table 2, and then searches a serviceable PLMN ID. Thereafter, the mobile terminal selects an available cell as the serving cell among Cell IDS pertaining to serviceable PLMNs.

From the above, it is clear that whether or not the cells pertaining to the respective PLMNs are available is decided by measuring signal strengths of the respective cells in advance and then comparing the measured signal strengths with threshold-1 to threshold-2. Whether or not the PLMNs are serviceable is decided by whether or not an available cell transmitting a received signal at strength of threshold-2 or more is included.

FIG. 2 is a flow chart showing a cell selection method of a mobile terminal in accordance with a first embodiment of the present invention. In this method, once a mobile terminal is switched on (S101), it starts searching PLMNs and Cells that have been registered in a neighbor cell profile list according to prescribed priorities (S102). The neighbor cell profile list stores respective IDS of available PLMNs that can permit the roaming of the mobile terminal, and current serviceable states of the respective available PLMNs. In other words, as shown in table 2, receivable available PLMN and non-receivable available PLMN are stored to be distinguished from each other.

While measuring signal strengths of the respective Cells pertaining to the available PLMNs registered in the profile list according to priorities (S3), the mobile terminal selects a cell having a measured signal strength value relatively greater than a prescribed threshold-1, as the serving cell (S4). Afterwards, the mobile terminal continues to measure the signal strengths of remaining cells having priorities lower than the selected serving cell (S5), and distinguishes and stores a cell having measured signal strength value relatively greater than a prescribed threshold-2, as the signal-receivable Cell (S6). In other words, as shown in table 2, since Cell 2 of PLMN 3 is a non-available Cell but is a value of which measured signal strength is relatively larger than the prescribed threshold-2, it is distinguished and stored as a signal-receivable Cell.

Through the aforementioned steps (S1–S6), the home PLMN is selected among the roaming-capable PLMNs, and among cells contained in the selected home PLMN, the serving cell providing useful services is selected.

The mobile terminal reads system information from the selected serving cell (S7), and determines whether or not to camp on the selected serving cell on the basis of the system information (S8). At this time, if the selected serving cell meets the camping condition, the mobile terminal camps on the corresponding serving cell (S9).

If the selected serving cell does not meet the camping condition, the mobile terminal reselects the cell that was distinguished and stored as the signal-receivable cell, as the serving cell (S10), and determines whether or not the mobile terminal is camped based on the system information of the reselected serving cell (S11). At this time, if the selected serving cell meets the camping condition, the mobile terminal is camped on the corresponding serving cell (S12).

Afterwards, there may often occur a case in which the mobile terminal user wishes to be given service from a PLMN which is not the home PLMN, a case in which signal strength of the serving cell that the current mobile terminal is camped on is weakened and thus the current serving cell is changed into a non-available cell in signal quality, or a case in which the mobile terminal loses the service coverage of the current serving cell.

In any of these situations, if there occurs a case in which cell reselection is requested (S13), the mobile terminal reselects a cell whose state information stored in advance in the profile list is registered as receivable (S14). Thereafter, based on the system information of the reselected cell, the mobile terminal may determine whether or not to camp on the reselected cell (S15). Whether or not to carry out this verifying process may present a problem on system operation, and thus this is an optional of the present invention. If it is proved that the reselected cell is a serviceable cell, the mobile terminal is camped on the reselected cell (S16).

FIG. 3 is a flowchart showing a cell selection method of a mobile terminal in accordance with a second embodiment of the present invention. In this method, once a mobile terminal is switched on (S101), the mobile terminal starts searching for PLMNs and Cells that have been registered in a neighbor cell profile list according to prescribed priorities (S102).

The neighbor cell profile list stores respective IDS of available PLMNs that can permit roaming of the mobile terminal. The profile list also stores current serviceable states of the respective available PLMNs. In other words, as shown in table 2, receivable available PLMNs and non-receivable available PLMNs are stored to be distinguished from each other.

While measuring signal strengths of the respective Cells pertaining to the available PLMNs registered in the profile list according to priorities (S103), the mobile terminal selects a cell having a measured signal strength value relatively greater than the prescribed threshold-1, as the serving cell (S104).

Through the aforementioned steps (S101–S104). The home PLMN is selected among the roaming-capable PLMNs, and among cells contained in the selected home PLMN, a serving cell providing useful services is selected.

Then, the mobile terminal reads system information from the selected serving cell (S105), and determines whether or not to camp on the selected serving cell based on the system information (S106).

At this time, if camping condition on the selected serving cell is met, the mobile terminal camps on the corresponding serving cell (S107). However, if the selected serving cell does not meet the camping condition, the mobile terminal measures signal strengths of the remaining cells having priorities lower than the previously selected serving cell (S108), and reselects a cell having a measured signal strength value which is relatively larger than the prescribed threshold-1 as the serving cell (S109).

Then, the mobile terminal determines whether or not to camp on the reselected serving cell based on the system information of the reselected serving cell (S110).

At this time, if the camping condition on the reselected serving cell is met, the mobile terminal camps on the reselected serving cell (S111). The mobile terminal continues to measure the signal strength with respect to the remaining cells having priorities lower than the reselected serving cell (S112), and distinguishes a cell having a measured signal strength value relatively larger than the prescribed threshold-1, as the signal-receivable cell, thereby constituting the profile list (S113). Here, the constitution of the profile list is a storage concept to the mobile terminal.

After the mobile terminal camps on one serving cell, if the PLMN ID is changed at the request of the mobile terminal user, or if the available condition of the current serving cell is changed (S114), the mobile terminal refers to the profile list that was in advance stored (S115).

Changing the PLMN ID by the request of the mobile terminal user may correspond to a case in which the user wishes to be given service from a PLMN which is not the home PLMN. Changing the available condition of the current serving cell may correspond to a case in which the signal strength of the current serving cell is weakened, so that the current serving cell is changed into a non-available cell in signal quality.

Then, the mobile terminal reselects a cell registered as a receivable cell in the state information stored in the profile list (S116), and optionally carries out a verification process for the reselected cell (S117). As previously mentioned, the verification process mentioned herein maybe carried out on the basis of the system information provided from cell.

Finally, if it is proved that the reselected cell is a serviceable cell, the mobile terminal camps on the reselected cell (S118).

A cell selection method in accordance with another embodiment of the present invention will now be described.

This embodiment corresponds to a case in which, after the mobile terminal camps on one serving cell, a PLMN ID is changed by the request of the mobile terminal user or an available condition of the current serving cell is changed. At this time, the mobile terminal refers to the profile list that was in advance stored.

Then, the mobile terminal measures the signal strength from a cell having the highest priority among cells registered as receivable in the state information stored in the profile list according to priorities thereof, and reselects as the serving Cell a Cell having a measured signal strength relatively larger than the prescribed threshold-1.

When this embodiment is explained by way of example of the stored list shown in table 2, when Cell 3 of current PLMN 2 is the serving Cell in the stored list, if reselection of cell is requested, the reselection step is carried out in a sequence in which signal strength of Cell 1 of PLMN 1 is measured starting from measurement of the signal strength of Cell 2 of PLMN 3, and then signal strength of Cell 2 of PLMN 1 is measured.

Then, the mobile terminal camps on through a verification process of the reselected serving Cell.

As a separate example, after selecting the serving Cell, the present invention measures the signal strengths of the remaining Cells that were registered in the neighbor cell profile list but were not selected, stores the measured signal strength values and the priorities of the measured values in the profile list. Subsequently, by again measuring signal strengths according to the priorities of the measured values, a cell may be reselected, or without again measuring signal strengths, a Cell maybe reselected having a measured value which is the highest.

In summary, a cell selection method of a mobile terminal according to the present invention has the following effects. Since identification information and state information of available Cells having measured signal strengths up to a receivable degree are in stored advance, when cell reselection is requested, time taken in cell reselection decreases remarkably compared with the conventional cell selection method, in which all the PLMNs and Cells registered in the neighbor cell profile list are searched according to the prescribed priority.

In other words, when there occurs a case in which an available condition of PLMN on service is changed into non-available state after the mobile terminal camps on Cell of a specific PLMN, or user of the mobile terminal wishes to reselect other PLMN that is not the current PLMN on service, there is no need to perform once again the process of initial cell selection. As a result, the time taken in reselecting a cell at the mobile terminal decreases remarkably.

It will be apparent to those skilled in the art that various modifications and variations can be made in the present invention. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for selecting cells for a mobile terminal, comprising:
   performing a search to locate cells of roaming-capable public land mobile networks (PLMNS) based on a prescribed priority;
   selecting one of said cells with a signal strength greater than a first predetermined threshold as a serving cell;
   comparing signal strengths of remaining cells to a second predetermined threshold lower than the first predetermined threshold;
   storing in the mobile terminal information indicating whether or not the remaining cells other than the selected serving cell are signal-receivable cells or signal-non-receivable cells based on results of said comparing; and
   reselecting one of said remaining cells for receiving a signal based on the stored information.

2. The cell selection method as claimed in claim 1, further comprising:
   measuring the signal strengths of the remaining cells, which have priorities lower than the serving cells, after the serving cell is selected.

3. The cell selection method as claimed in claim 2, wherein a PLMN which includes a signal-receivable cell is set and stored in a serviceable state, and a PLMN which includes a signal-non-receivable cell is set and stored in a non-serviceable state.

4. The cell selection method as claimed in claim 3, wherein the reselecting includes preferentially searching only the cells of the PLMN set in the serviceable state.

5. The cell selection method as claimed in claim 4, wherein the reselecting includes reselecting a signal-receivable cell from the preferentially searched PLMNs, and camping on the reselected cell.

6. The cell selection method as claimed in claim 1, wherein the reselecting includes:
   preferentially searching one of the signal-receivable cells,
   reading system information corresponding to the preferentially searched cell to determine whether or not the preferentially searched cell is camped on, and
   if the searched cell meets a camping condition, camping on the cell.

7. The cell selection method as claimed in claim 1, wherein the second predetermined threshold is set at a minimum value for allowing the cells to transmit signals.

8. The cell selection method as claimed in claim 1, wherein the storing includes storing a neighbor cell profile list including said information indicating whether or not the remaining cells, except for the selected serving cell, are signal-receivable cells or signal-non-receivable cells, wherein the list further indicates signal strength of the remaining cells and priority of the signal strength.

9. The cell selection method as claimed in claim 8, wherein the reselecting includes searching the cells according to the priorities of the signal strengths stored in the profile list.

10. The cell selection method as claimed in claim 8, wherein the reselecting includes:
    reselecting a cell having a highest priority in signal strength,
    reading system information of the reselected cell to determine whether or not the reselected cell is camped on, and
    if the reselected cell meets a camping condition, camping on the cell.

11. A method for selecting cells for a mobile terminal, comprising:
    performing a priority search to locate networks in an area of the mobile terminal;
    selecting one of the networks to provide service to the mobile terminal, with remaining ones of the networks not providing service to the mobile terminal;
    storing, in the mobile terminal, information indicating whether or not the remaining networks include signal-receivable cells or signal-non-receivable cells; and
    selecting one of the remaining networks having a signal-receivable cell to provide service to the mobile terminal based on the stored information.

12. The method of claim 11, wherein the search is performed based on priority of the networks indicated by the stored information.

13. The method of claim 11, wherein selecting one of the networks includes:
    comparing signal strengths of cells in the networks to a predefined threshold;
    determining which network has a cell with a signal strength that exceeds the predefined threshold; and
    selecting the network having a cell with a signal strength that exceeds the predefined threshold as the network to provide service to the mobile terminal.

14. The method of claim 13, further comprising:
    selecting said cell with a signal strength that exceeds the predefined threshold as a serving cell for the mobile terminal.

15. The method of claim 11, wherein the remaining networks are roaming networks.

16. The method of claim 11, further comprising:
    comparing signal strengths of cells in the remaining networks to a predefined threshold; and
    determining whether the cells are signal-receivable cells or signal-non-receivable cells based on results of said comparing.

17. The method of claim 16, further comprising:
    updating status of the signal-receivable cells and signal-non-receivable cells in said stored information as said signal strengths change relative to the predefined threshold.

18. The method of claim 11, further comprising:
    storing a table including:
    (a) a list of the networks,
    (b) identification of at least one neighboring cell in each of the networks,
    (c) information indicative of a signal strength of said at least one cell in each of the networks, wherein the stored information indicating whether or not the remaining networks include signal-receivable cells or signal-non-receivable cells is based on said signal strength information.

19. The method of claim 18, wherein selecting one of the remaining networks is performed based on said table.

20. The method of claim 11, wherein the network selected to provide service to the mobile terminal includes a cell with a signal strength greater than a first predefined threshold, the signal-receivable cells in the remaining networks have signal strengths greater than a second predefined threshold that is lower than the first predefined threshold, and the signal-non-receivable cells in the remaining networks have signal strengths lower than the second predefined threshold.

* * * * *